(12) United States Patent
Hsiao et al.

(10) Patent No.: US 11,608,136 B1
(45) Date of Patent: Mar. 21, 2023

(54) BICYCLE ARMREST HANDLEBAR

(71) Applicant: SIENNA GROUP CORP., Taichung (TW)

(72) Inventors: Chung-Pin Hsiao, Taichung (TW); Chieh-Ting Huang, Taichung (TW)

(73) Assignee: SIENNA GROUP CORP., Taichung (TW)

( * ) Notice: Subject to any disclaimer, the term of this patent is extended or adjusted under 35 U.S.C. 154(b) by 5 days.

(21) Appl. No.: 17/537,676

(22) Filed: Nov. 30, 2021

(51) Int. Cl.
*B62K 21/12* (2006.01)

(52) U.S. Cl.
CPC .................................. *B62K 21/125* (2013.01)

(58) Field of Classification Search
CPC .................................................... B62K 21/125
See application file for complete search history.

(56) References Cited

U.S. PATENT DOCUMENTS

| | | | |
|---|---|---|---|
| 6,928,897 B2 * | 8/2005 | Duncan | B62K 21/125 74/551.8 |
| 7,077,029 B2 * | 7/2006 | McColligan | B62K 21/125 74/551.8 |
| 7,698,967 B2 * | 4/2010 | Ording | B62K 21/125 74/551.8 |
| 8,931,744 B1 * | 1/2015 | Me | B62B 5/06 248/278.1 |
| 2021/0237825 A1 * | 8/2021 | Gu | B62K 21/125 |

* cited by examiner

*Primary Examiner* — Vicky A Johnson
(74) *Attorney, Agent, or Firm* — Demian K. Jackson; Jackson IPG PLLC (57) ABSTRACT

A bicycle armrest handlebar, designed to be used in pairs and connected to a bicycle steeling handlebar near a middle portion of the bicycle steeling handlebar, includes a coupling segment, a supporting segment, and a holding segment. The coupling segment is coupled to the bicycle steeling handlebar. The supporting segment is located at a front end of the coupling segment and has an upper surface that is a concave curved surface. The supporting segment has an outwardly expanded portion, an inwardly reduced and upwardly inclined portion and a downwardly inclined portion that are arranged in sequence from its rear end to its front end. The holding segment is located at a front end of the downwardly inclined portion of the supporting segment.

10 Claims, 9 Drawing Sheets

BICYCLE ARMREST HANDLEBAR

FIELD OF THE INVENTION

The present invention relates to a bicycle armrest handlebar, which has an ergonomic design that is first outwardly expanded and then inwardly reduced, an airflow guide design though an inner abutment surface higher than an outer abutment surface, and a unique wind deflection design.

BACKGROUND OF THE INVENTION

With an awareness of environmental protection, energy saving and carbon reduction, bicycles have been widely used for sports, commuting, professional races and other purposes. In order to increase the riding efficiency for a rider to compete in a long-distance professional race or exercise, a pair of armrest handlebars and a pair of armrest pads are provided and disposed near the middle portion of the bicycle steeling handlebar. For a long-distance riding, the rider can rest his/her arms on the armrest handlebars or armrest pads to support the partial weight of his/her body, so as to take a rest and relaxation and have a better physical capability during the long-distance race or exercise.

Taiwan Utility Model Publication No. 542168 discloses an improved positioning structure for armrest pads of a bicycle. As shown in the figures, each armrest handlebar is in the form of a round tube, including a straight segment and an upwardly curved segment. The rider can rest his/her forearm on the straight segment of the armrest handlebar and hold the upwardly curved segment of the armrest handlebar with his/her hand. However, the conventional armrest handlebar is in the form of a round tube, which is not designed according to the configuration and external shape of the human arm. When the rider rests his/her forearm on the straight segment of the armrest handlebar in the form of a round tube for a long time, because the upper surface of the straight segment is a convex arc to be in contact with the forearm, it is not easy for the rider's forearm to rest on it. As a result, the rider is tired or uncomfortable easily, not meeting the need for the rider to take a rest.

When a rider participates in a long-distance professional race with a bicycle equipped with this kind of armrest handlebar, because the upper surface of the straight segment of the armrest handlebar is a convex arc to be in contact with the forearm, there is a gap between the convex arc and the rider's forearm, resulting in unstable air flow and resistance to reduce the pedaling efficiency of the rider. In the professional race, every second counts, the armrest handlebar should be improved.

In general, the shoulder width of a rider is wider than the width of a pair of conventional armrest handlebars that are disposed near the middle portion of the bicycle steeling handlebar. The rider's arms extending from both sides of the shoulder to the front ends of the pair of armrest handlebars and the hands holding the upwardly curved segments of the pair of armrest handlebars form a triangular shape. The pair of armrest handlebars is disposed near the middle portion of the bicycle steeling handlebar and arranged in parallel with each other to extend forwardly. When the rider rests his/her arms on the armrest handlebars or armrest pads to support the partial weight of his/her body to take a rest and relaxation, because of the triangular shape constituted by the arms extending from both sides of the shoulder to the front ends of the pair of armrest handlebars and the hands holding the upwardly curved segments of the pair of armrest handlebars, the two arms of the rider have to retract inwardly toward the middle portion of the bicycle steeling handlebar to rest his/her forearms on the armrest handlebars that are parallel with each other. As a result, the rider is tired or uncomfortable easily, not meeting the need for the rider to take a rest.

As disclosed in U.S. Patent Application No. US 2021/0237825 A1, titled "armrest handlebar and bicycle handlebar assembly having the same", a curved surface is formed by recessing from a top surface of a leaned segment of the armrest handlebar for the rider's forearm to rest thereon, thereby improving the design of the round tube for the conventional armrest handlebar. However, it is not designed according to the configuration and external shape of the human arm. As a result, when the rider rests his/her forearm on the armrest handlebar for a long time, the rider may feel tired or uncomfortable.

As disclosed in U.S. Patent Application No. US 2021/0237825 A1, in cooperation with its figures, a pair of armrest handlebars is disposed near the middle portion of a bicycle steering handlebar and arranged in parallel with each other to extend forwardly. The width of the pair of armrest handlebars is greater than the prior art, but not designed according to the shoulder width of a rider. The rider's arms extending from both sides of the shoulder to the front ends of the pair of armrest handlebars and the hands holding the upwardly curved segments of the pair of armrest handlebars form a triangular shape. For a long-distance riding, the rider can rest his/her arms on the armrest handlebars that are parallel to each other. The two arms of the rider have to retract inwardly toward the middle portion of the bicycle steering handlebar to rest his/her forearms on the armrest handlebars. As a result, the rider is tired or uncomfortable easily, not meeting the need for the rider to take a rest.

Accordingly, the inventor of the present invention has devoted himself based on his many years of practical experiences to solve these problems and develop an armrest handlebar that is ergonomic, can guide air flow effectively and has a wind deflection design.

SUMMARY OF THE INVENTION

The primary object of the present invention is to provide a bicycle armrest handlebar, which has an ergonomic design that is first outwardly expanded and then inwardly reduced, an airflow guide design though an inner abutment surface higher than an outer abutment surface, and a unique wind deflection design.

In order to achieve the above object, the present invention provides a bicycle armrest handlebar, designed to be used in pairs and connected to a bicycle steering handlebar near a middle portion of the bicycle steering handlebar. The bicycle armrest handlebar comprises a coupling segment, a supporting segment, and a holding segment. The coupling segment is coupled to the bicycle steering handlebar. The supporting segment is located at a front end of the coupling segment. The supporting segment has an outwardly expanded portion, an inwardly reduced and upwardly inclined portion and a downwardly inclined portion that are arranged in sequence from its rear end to its front end. The holding segment is located at a front end of the downwardly inclined portion of the supporting segment.

Furthermore, an armrest pad is provided and coupled to the coupling segment, so that the elbow of the rider can rest on it.

DETAILED DESCRIPTION OF THE PREFERRED EMBODIMENTS

Embodiments of the present invention will now be described, by way of example only, with reference to the accompanying drawings.

Figure 6:
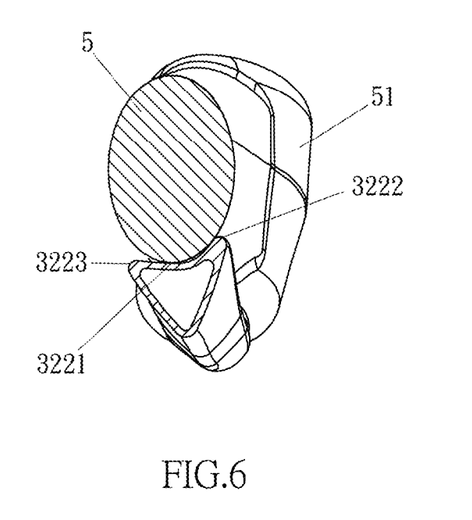
FIG. 6 is a cross-sectional view taken along line B-B of FIG. 5, wherein the supporting segment is in the form of a triangular tube.
Figure 7:
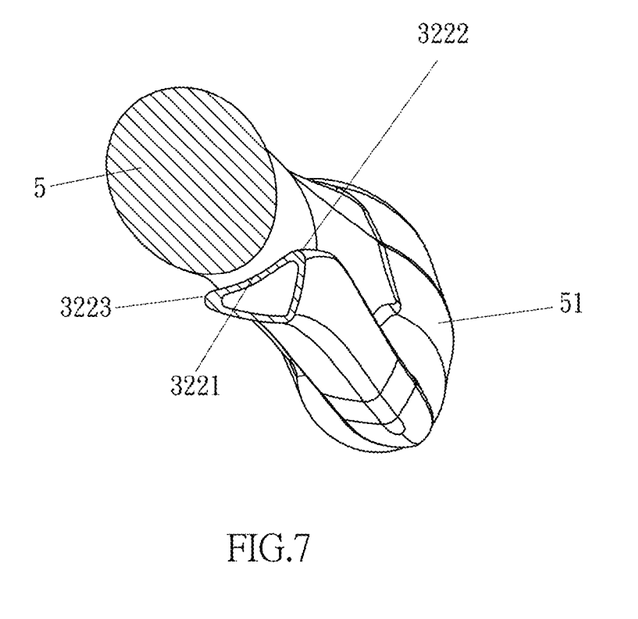
FIG. 7 is a cross-sectional view taken along line C-C of FIG. 5, wherein the supporting segment is in the form of a triangular tube.
Figure 8:
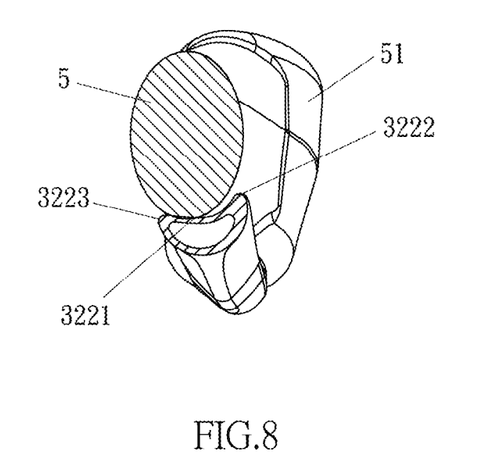
FIG. 8 is a cross-sectional view taken along line B-B of FIG. 5, wherein the supporting segment is in the form of a meniscus tube.
Figure 9:
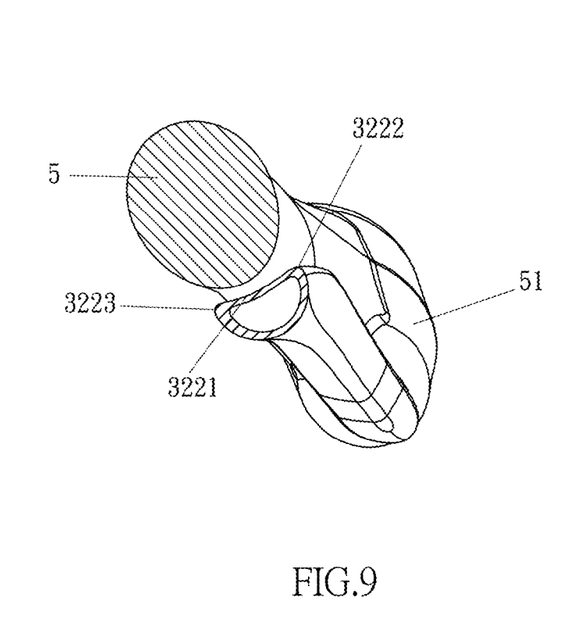
FIG. 9 is a cross-sectional view taken along line C-C of FIG. 5, wherein the supporting segment is in the form of a meniscus tube.
Figure 10:
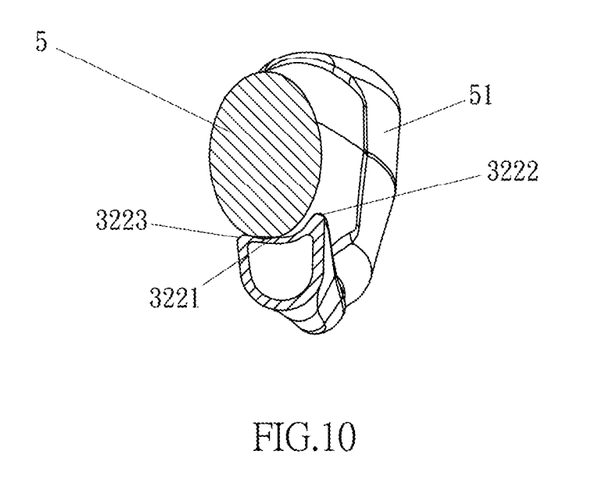
FIG. 10 is a cross-sectional view taken along line B-B of FIG. 5, wherein the supporting segment is in the form of a bullet-shaped tube.
Figure 11:
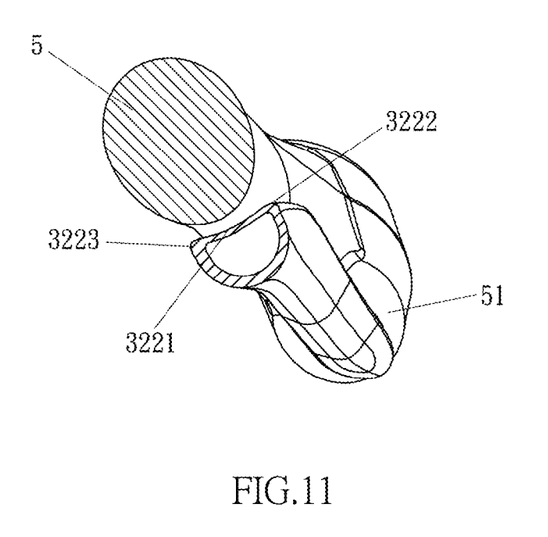
FIG. 11 is a cross-sectional view taken along line C-C of FIG. 5, wherein the supporting segment is in the form of a bullet-shaped tube.

Referring to FIGS. 1 to 12, the present invention discloses a bicycle armrest handlebar 3, which is designed to be used in pairs and connected to a bicycle steering handlebar 4 near the middle portion of the bicycle steering handlebar 4. The bicycle armrest handlebar 3 includes a coupling segment 31, a supporting segment 32, and a holding segment 33. The coupling segment 31 is in the form of a round tube to be coupled to the bicycle steering handlebar 4. The supporting segment 32 is located at a front end of the coupling segment 31. The supporting segment 32 may be in the form of a triangular tube (as shown in FIG. 6 and FIG. 7), a meniscus tube (as shown in FIG. 8 and FIG. 9), or a bullet-shaped tube (as shown in FIG. 10 and FIG. 11). The supporting segment 32 is for the forearm 5 of the rider's arm to rest thereon. The supporting segment 32 has an outwardly expanded portion 321, an inwardly reduced and upwardly inclined portion 322 and a downwardly inclined portion 323 that are arranged in sequence from its rear end to its front end. The upper surface of the supporting segment 32 from the inwardly reduced and upwardly inclined portion 322 to the downwardly inclined portion 323 is a concave curved surface 3221. Two sides of the concave curved surface 3221 are defined as an inner abutment surface 3222 and an outer abutment surface 3223. The inner abutment surface 3222 is higher than the outer abutment surface 3223. The holding segment 33 is in the form of a round tube and located at a front end of the downwardly inclined portion 323 of the supporting segment 32. The holding segment 33 is tilted upwardly for the rider's hand 51 to hold thereon.

When applied to actual implementation, the present invention further includes an armrest pad 6 coupled to the coupling segment 31 of the bicycle armrest handlebar 3, so that the elbow of the rider can rest on it.

Figure 1:
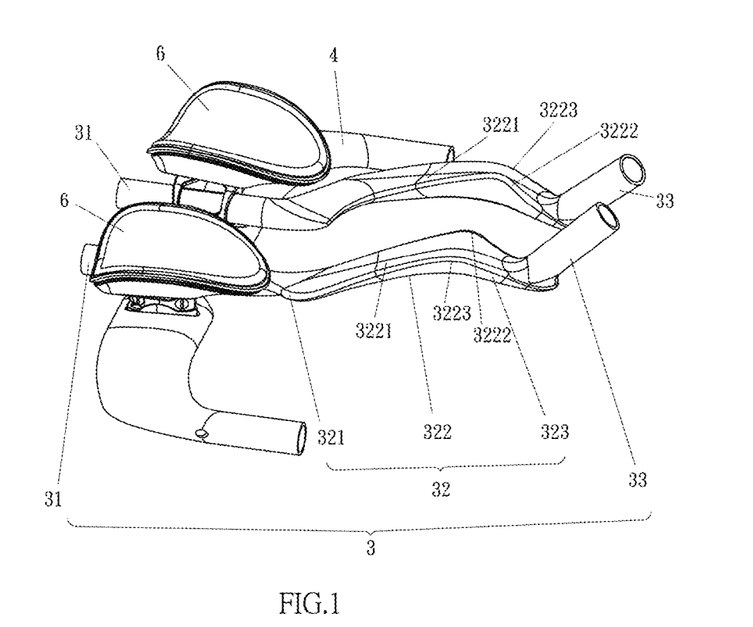
FIG. 1 is a schematic view of the implementation of a bicycle armrest handlebar of the present invention.
Figure 2:
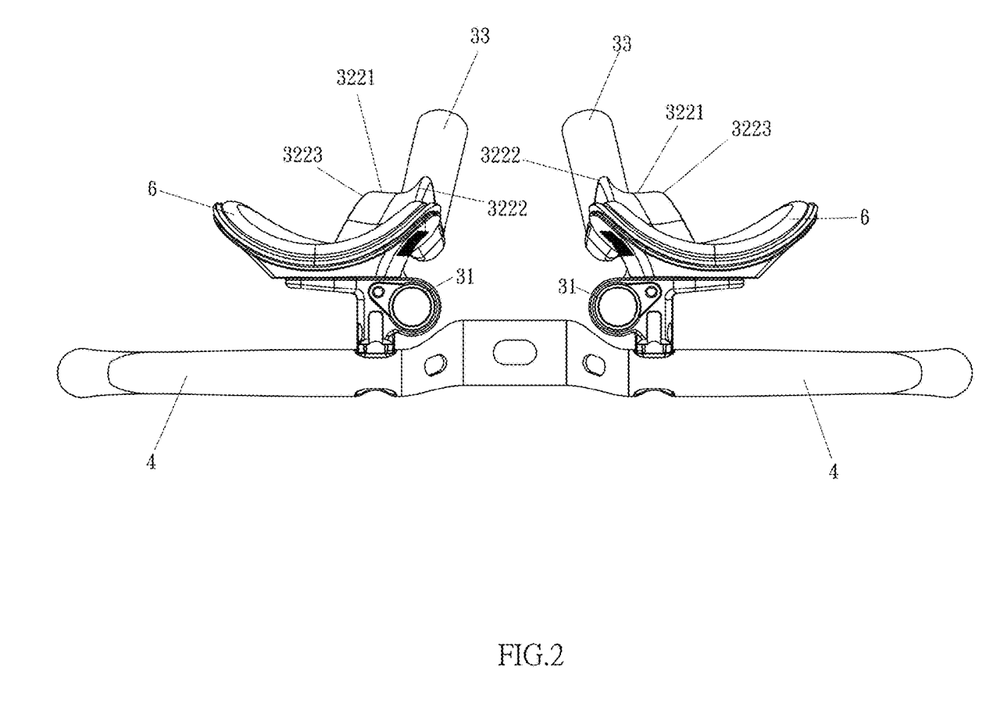
FIG. 2 is a front view of FIG. 1.
Figure 3:
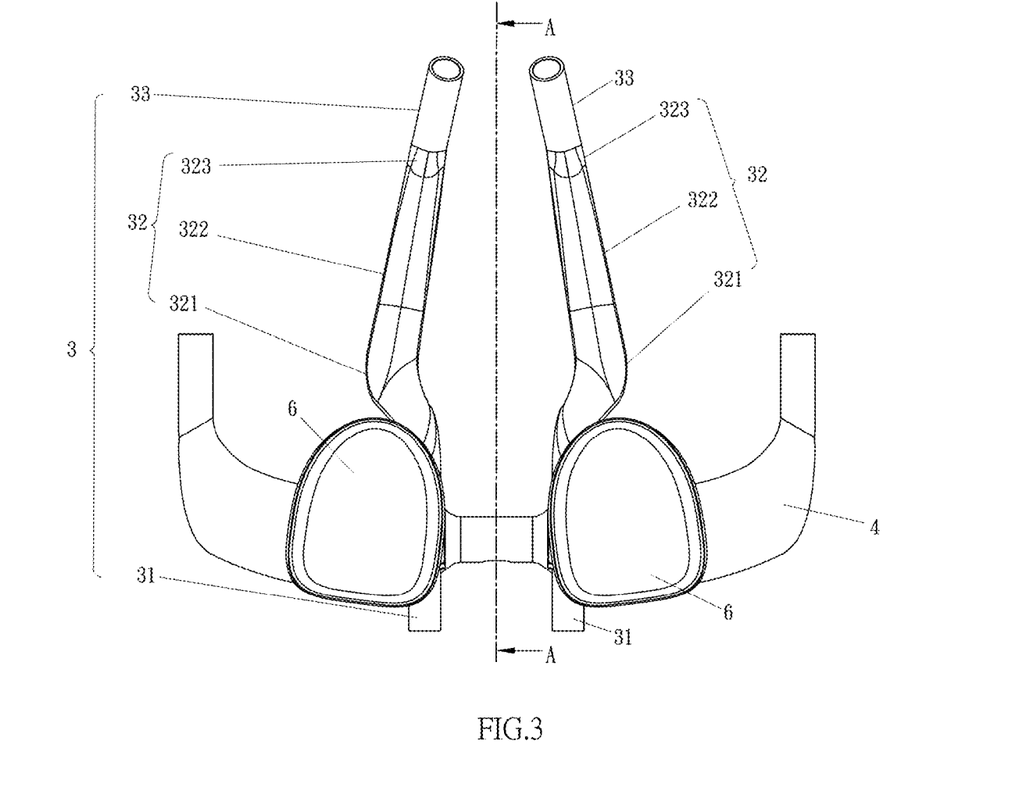
FIG. 3 is a top view of FIG. 1.

The present invention has the following features:

(A) The supporting segment 32 is first outwardly expanded and then inwardly reduced. As shown in FIG. 3, the bicycle armrest handlebar 3, used in pairs, is connected to the bicycle steering handlebar 4 near the middle portion of the bicycle steering handlebar 4, like a conventional bicycle armrest handlebar. The supporting segment 32 located at the front end of the coupling segment 31 has the outwardly expanded portion 321, the inwardly reduced and upwardly inclined portion 322 and the downwardly inclined portion 323 that are arranged in sequence from its rear end coupled to the front end of the coupling segment 31 to its front end. The supporting segment 32 located at the front end of the coupling segment 31 for the forearm 5 of the rider's arm to rest thereon is first outwardly expanded and then inwardly reduced to form a triangular configuration.

Because the shoulder width of a rider is generally about at least 350 mm, this design is matched with the triangle from the arms at both sides of the rider's shoulder to the rider's both hands 51 holding on the holding segments 33 of the bicycle armrest handlebars 3, providing an ergonomic design that maintains the comfort of the riding posture and reduces the physical exertion of the rider.

(B) The inner abutment surface 3222 is higher than the outer abutment surface 3223. As shown in FIG. 2, FIG. 4 to FIG. 11, as to the supporting segment 32 for the forearm 5 of the rider's arm to rest thereon, the upper surface of the supporting segment 32 from the inwardly reduced and upwardly inclined portion 322 to the downwardly inclined portion 323 is the concave curved surface 3221. The two sides of the concave curved surface 3221 are defined as the inner abutment surface 3222 and the outer abutment surface 3223. The inner abutment surface 3222 is higher than the outer abutment surface 3223.

Figure 12:
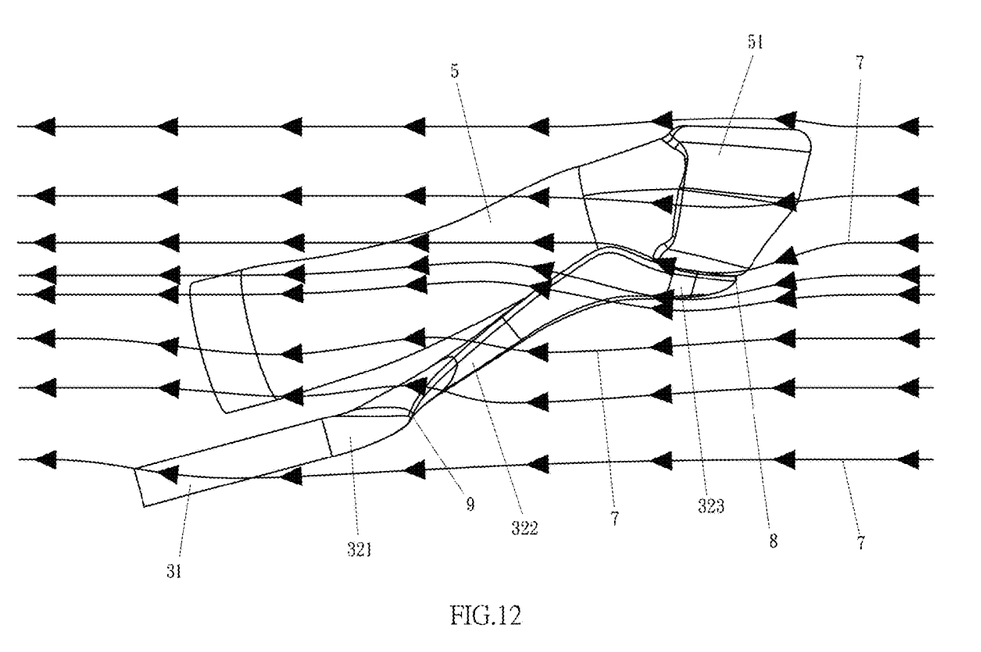
FIG. 12 is a schematic view of the bicycle armrest handlebar of the present invention, wherein the wind is deflected.

Thus, the configuration that the upper surface of the supporting segment 32 from the inwardly reduced and upwardly inclined portion 322 to the downwardly inclined portion 323 is the concave curved surface 3221 and the configuration that the inner abutment surface 3222 is higher than the outer abutment surface 3223 are to fill the gap between the rider's forearm 5 and the armrest handlebar (as shown in FIGS. 6 to 11), thereby improving the fluidity of air flow 7 between the rider's arms (as shown in FIG. 12), so as to reduce air resistance.

Figure 4:
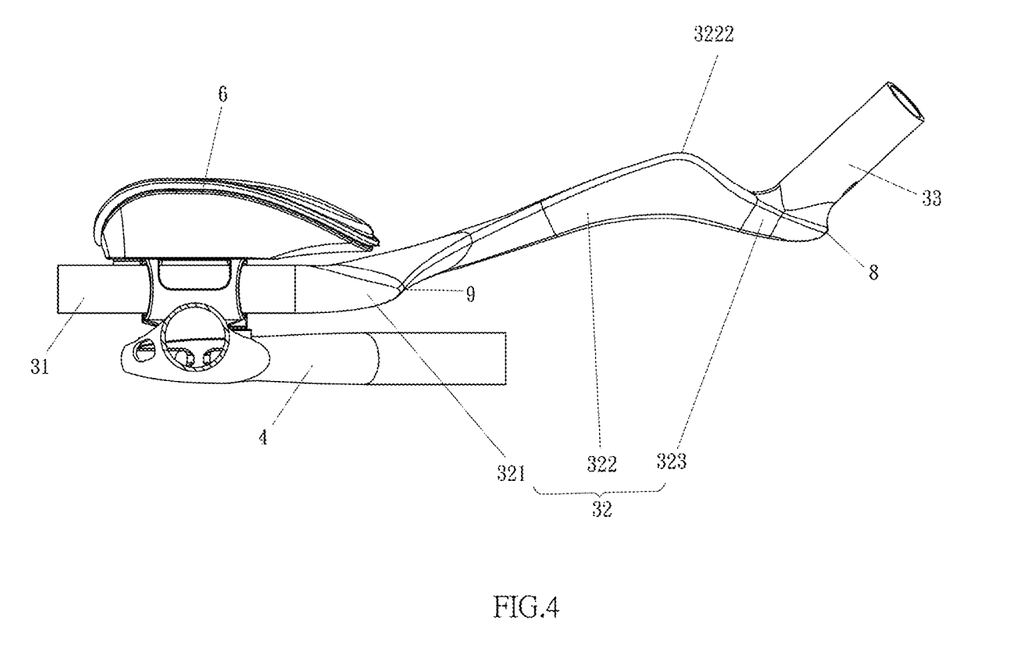
FIG. 4 is a cross-sectional view taken along line A-A of FIG. 3.
Figure 5:
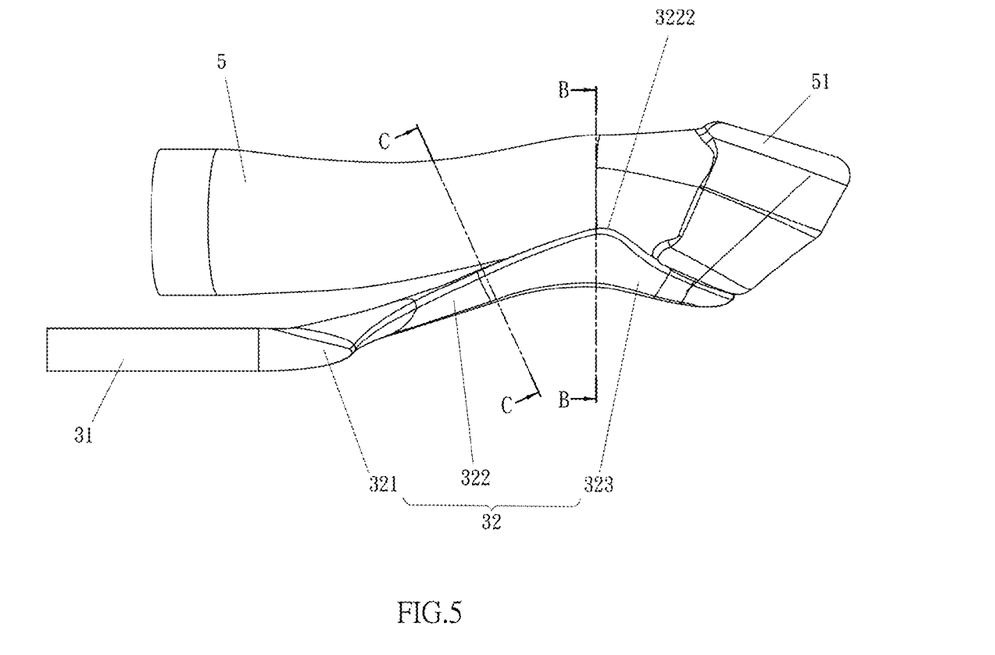
FIG. 5 is a schematic view of the bicycle armrest handlebar of the present invention when in use, wherein the rider rests his/her forearm on the supporting segment of the bicycle armrest handlebar.

(C) As shown in FIGS. 3 to 11, because the supporting segment 32 for the forearm 5 of the rider's arm to rest thereon is in the form of a triangular, meniscus or bullet-shaped tube and located at the front end of the coupling segment 31, in cooperation with the triangular configuration that is first outwardly expanded and then inwardly reduced (as shown in FIG. 3), a first wind deflection point 8 is formed at the junction of the downwardly inclined portion 323 of the supporting segment 32 and the holding segment 33 and a second wind deflection point 9 (as shown in FIG. 4) is formed at the junction of the outwardly expanded portion 321 and the inwardly reduced and upwardly inclined portion 322 of the supporting segment 32, so as to reduce the windward area to achieve the effect of improving air resistance.

The present invention has the following advantages and effects:

(1) It has an ergonomic design that is first outwardly expanded and then inwardly reduced. A person skilled in the art knows that cycling is not just a general road ride. In the case of professional long-distance races, the bicycle should be ergonomically designed for the rider to save energy on suitable roads. For this reason, in the armrest handlebar provided by the present invention, in addition to the concave curved surface, the supporting segment located at the front end of the coupling segment for the forearm of the rider's arm to rest thereon forms a triangular configuration that is first outwardly expanded and then inwardly reduced, so that the rider can rest the elbow of the arm on the corresponding armrest pad easily and the forearm on the supporting segment of the armrest handlebar, with the hand to hold on the holding segment. The rider rides the bicycle in a natural and ergonomic posture from the shoulder to both hands, thereby saving energy.

(2) It has an airflow guide design though the inner abutment surface higher than the outer abutment surface. The upper surface of the supporting segment is the concave curved surface and the inner abutment surface is higher than the outer abutment surface to fill the gap between the rider's forearm and the armrest handlebar, thereby improving the fluidity of air flow between the rider's arms, so as to reduce air resistance.

(3) It has a unique wind deflection design. The supporting segment of the armrest handlebar has a first wind deflection point and a second wind deflection point, so that the supporting segment can reduce wind resistance and improve air resistance when the rider rides the bicycle.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A bicycle armrest handlebar, designed to be used in pairs and connected to a middle portion of a bicycle steering handlebar, comprising a coupling segment, a supporting segment and a holding segment; the coupling segment being coupled to the bicycle steering handlebar; the supporting segment being located at a front end of the coupling segment, the supporting segment having an outwardly expanded portion, an inwardly reduced and upwardly inclined portion and a downwardly inclined portion that are arranged in sequence from a rear end of the supporting segment to a front end of the supporting segment; the holding segment being located at a front end of the downwardly inclined portion of the supporting segment, wherein the supporting segment is in the form of a triangular tube.

2. The bicycle armrest handlebar as claimed in claim 1, wherein the coupling segment is in the form of a round tube.

3. The bicycle armrest handlebar as claimed in claim 1, wherein an upper surface of the supporting segment from the inwardly reduced and upwardly inclined portion to the downwardly inclined portion is a concave curved surface.

4. The bicycle armrest handlebar as claimed in claim 1, wherein the holding segment is in the form of a round tube.

5. The bicycle armrest handlebar as claimed in claim 1, wherein the holding segment is tilted upwardly.

6. The bicycle armrest handlebar as claimed in claim 1, wherein an upper surface of the supporting segment from the inwardly reduced and upwardly inclined portion to the downwardly inclined portion is a concave curved surface, two sides of the concave curved surface are defined as an inner abutment surface and an outer abutment surface, and the inner abutment surface is higher than the outer abutment surface.

7. The bicycle armrest handlebar as claimed in claim 1, wherein a first wind deflection point is formed at a junction of the downwardly inclined portion of the supporting segment and the holding segment, and a second wind deflection point is formed at a junction of the outwardly expanded portion and the inwardly reduced and upwardly inclined portion of the supporting segment.

8. The bicycle armrest handlebar as claimed in claim 1, wherein an armrest pad is provided and coupled to the coupling segment.

9. A bicycle armrest handlebar, designed to be used in pairs and connected to a middle portion of a bicycle steering handlebar, comprising a coupling segment, a supporting segment and a holding segment; the coupling segment being coupled to the bicycle steering handlebar; the supporting segment being located at a front end of the coupling segment, the supporting segment having an outwardly expanded portion, an inwardly reduced and upwardly inclined portion and a downwardly inclined portion that are arranged in sequence from a rear end of the supporting segment to a front end of the supporting segment; the holding segment being located at a front end of the downwardly inclined portion of the supporting segment, wherein an upper surface of the supporting segment from the inwardly reduced and upwardly inclined portion to the downwardly inclined portion is a concave curved surface.

10. A bicycle armrest handlebar, designed to be used in pairs and connected to a middle portion of a bicycle steering handlebar, comprising a coupling segment, a supporting segment and a holding segment; the coupling segment being coupled to the bicycle steering handlebar; the supporting segment being located at a front end of the coupling segment, the supporting segment having an outwardly expanded portion, an inwardly reduced and upwardly inclined portion and a downwardly inclined portion that are arranged in sequence from a rear end of the supporting segment to a front end of the supporting segment; the holding segment being located at a front end of the downwardly inclined portion of the supporting segment, wherein an upper surface of the supporting segment from the inwardly reduced and upwardly inclined portion to the downwardly inclined portion is a concave curved surface, two sides of the concave curved surface are defined as an inner abutment surface and an outer abutment surface, and the inner abutment surface is higher than the outer abutment surface.

* * * * *